(12) United States Patent
Leonoff

(10) Patent No.: US 8,561,851 B1
(45) Date of Patent: Oct. 22, 2013

(54) SPORTS BOTTLE WITH PRELOADED VALVE AND METHODS

(76) Inventor: Christopher A. Leonoff, Carmel Valley, CA (US)

( * ) Notice: Subject to any disclaimer, the term of this patent is extended or adjusted under 35 U.S.C. 154(b) by 37 days.

(21) Appl. No.: 13/373,758

(22) Filed: Nov. 28, 2011

Related U.S. Application Data

(63) Continuation-in-part of application No. 12/054,307, filed on Mar. 24, 2008, now abandoned.

(60) Provisional application No. 60/896,763, filed on Mar. 23, 2007.

(51) Int. Cl.
*B65D 37/00* (2006.01)

(52) U.S. Cl.
USPC ........... 222/215; 222/481; 222/490; 222/491; 220/703; 215/11.5; 137/847; 137/853

(58) Field of Classification Search
USPC ......... 222/206–215, 478, 481, 491–499, 490; 220/703; 215/11.5, 250, 306, 329; 137/843–847, 852–855, 859
See application file for complete search history.

(56) References Cited

U.S. PATENT DOCUMENTS

| | | | | |
|---|---|---|---|---|
| 2,394,722 | A | * | 2/1946 | Sloane ..................... 215/11.5 |
| 4,174,053 | A | | 11/1979 | Shimizu |
| 4,180,106 | A | | 12/1979 | Coetzee |
| 4,210,262 | A | | 7/1980 | Donaldson |
| 4,311,245 | A | | 1/1982 | Maffei |
| 4,524,805 | A | * | 6/1985 | Hoffman ...................... 137/846 |
| 4,535,818 | A | * | 8/1985 | Duncan et al. ................ 137/846 |
| 4,598,845 | A | | 7/1986 | Ozdemir |
| 4,807,785 | A | | 2/1989 | Pritchett |
| 4,928,836 | A | | 5/1990 | Wu et al. |
| 5,010,925 | A | | 4/1991 | Atkinson et al. |
| 5,048,705 | A | | 9/1991 | Lynd et al. |
| 5,285,933 | A | * | 2/1994 | Gentes et al. ................ 222/148 |
| 5,301,707 | A | * | 4/1994 | Hofsteenge ................... 137/12 |
| 5,431,290 | A | * | 7/1995 | Vinciguerra ................. 215/11.5 |
| 5,433,353 | A | * | 7/1995 | Flinn ............................ 222/481 |
| 5,465,857 | A | | 11/1995 | Yang |
| 5,487,490 | A | * | 1/1996 | Estes ................................ 222/1 |
| 5,699,921 | A | * | 12/1997 | Rodriguez .................. 215/11.5 |
| 5,862,961 | A | | 1/1999 | Motta et al. |
| 6,073,812 | A | | 6/2000 | Wade et al. |
| 6,092,551 | A | * | 7/2000 | Bennett ........................ 137/846 |
| 6,138,710 | A | * | 10/2000 | Chomik et al. .......... 137/512.15 |
| 6,209,736 | B1 | * | 4/2001 | Chen et al. .................... 215/11.5 |
| 6,302,286 | B1 | | 10/2001 | Witherspoon |
| 6,367,662 | B1 | | 4/2002 | Dorman et al. |
| 6,540,105 | B2 | | 4/2003 | Dorman et al. |
| 6,779,694 | B2 | | 8/2004 | Young |
| 7,040,499 | B1 | | 5/2006 | Reif |

* cited by examiner

*Primary Examiner* — Paul R Durand
*Assistant Examiner* — Andrew P Bainbridge

(57) ABSTRACT

A beverage bottle for storing and dispensing water and impure sports beverages having a container and a dispensing opening on a top wall movable between an open position and a closed position and a unitary valve disposed within the container bottom wall having a vertically sinuous contour, and laterally opposed, laterally actuating, compliant slit faces and a substantially rigid annular flat surface. As the vertically sinuous contour is flattened upon the annular flat surface, the slit faces are laterally urged together establishing a preloaded seal, for leak resistant valve operation, and reduced restriction dispensing of water and impure sports beverages.

20 Claims, 7 Drawing Sheets

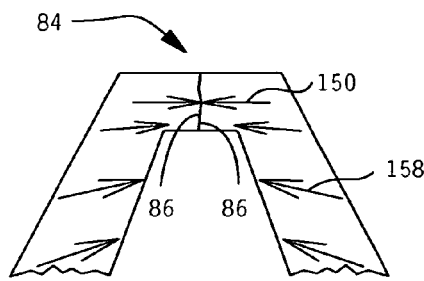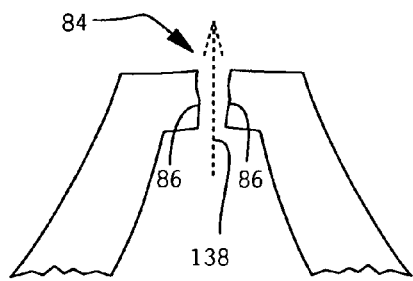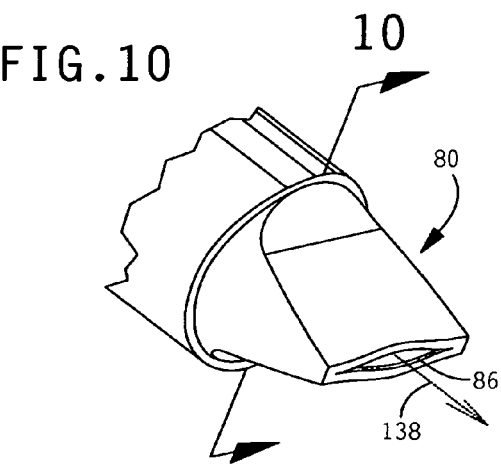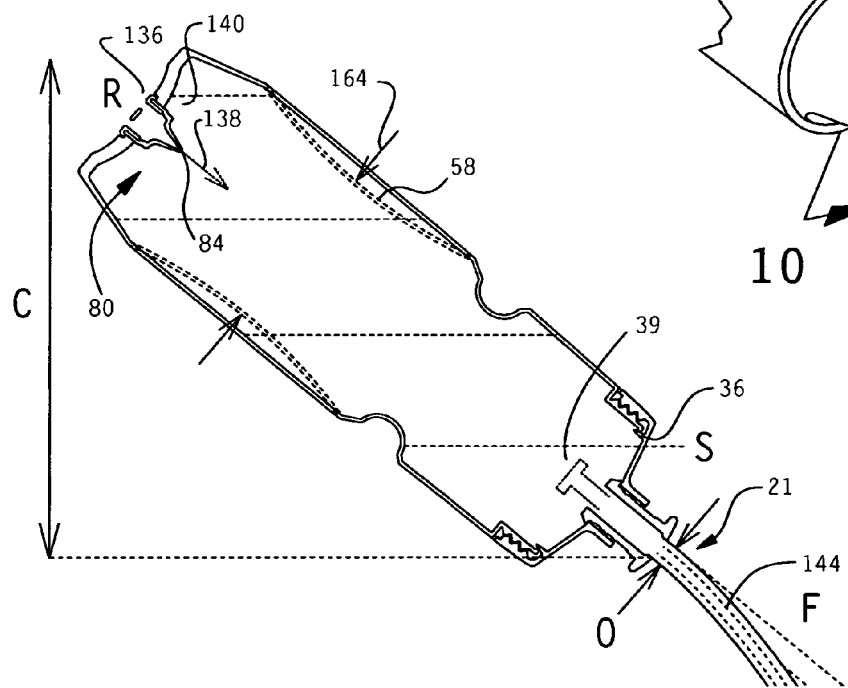

FIG.15
FIG.16A
FIG.16B
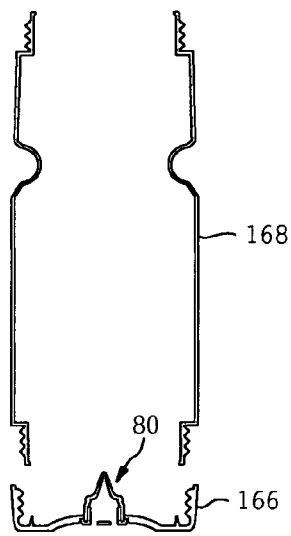
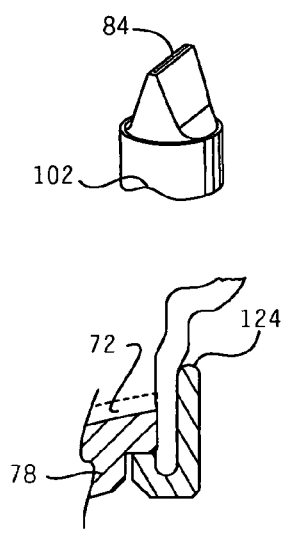
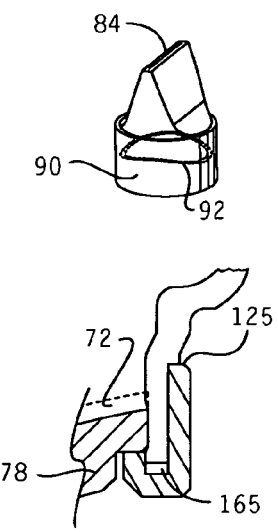
FIG.16C
FIG.16D
FIG.16E
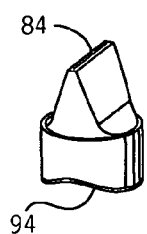
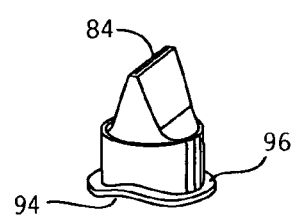
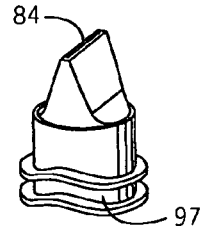
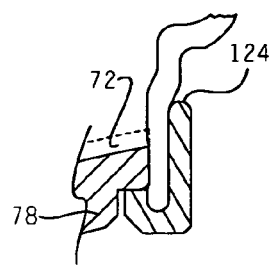
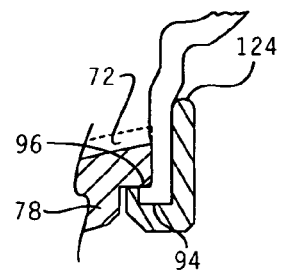
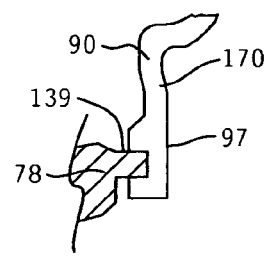

SPORTS BOTTLE WITH PRELOADED VALVE AND METHODS

CROSS-REFERENCE TO RELATED APPLICATIONS

This application is a continuation-in-part of application Ser. No. 12/054,307 filed Mar. 24, 2008, entitled "Rapid Flow Bottle", which claims the benefit of provisional patent application Ser. No. 60/896,763 filed Mar. 23, 2007 entitled "Rapid Flow Bottle" by the present inventor.

FIELD OF THE INVENTION

The present invention relates to bottles, and more specifically, to sports bottles intended for use during sports activities and with sports beverages.

BACKGROUND OF THE INVENTION

It is known that by venting air within a sports bottle, various flow characteristics may be improved. However, maintaining an effective leak seal has been difficult to achieve. Multiple prior bottles have been patented which include bottom-mounted valves intended to improve the dispensing and flow aspects of the container, but effective prevention of leakage has been elusive.

The use of modern, highly supplemented, sports performance drinks, or sports beverages, have become widely popular in cycling and within endurance sports. Such beverages contain additives that are either premixed in a commercial beverage product, or are added in the form of powders or tablets. In the latter case, it is not uncommon for some additives to remain undissolved and suspended within the beverage in the form of particulates. Prolonged storage of such sports liquids present the buildup of films, or residues upon internal container surfaces. Also, crystallization occurs as sugary liquids are exposed to evaporation. The properties of these liquids present immense sealing challenges for check valves, and have a tendency to cause leakage failure in such prior art bottles.

Additionally, many of the containers used in professional and competitive sports are made from plastic material that is manufactured with a blow-molding process. Blow-molding permits consistent outside bottle geometry. However, the inside wall, and in particular, the inside bottom-wall is subject to a significant and unpredictable variation in wall thickness, and in many bottles, an uneven seam.

Hence far, the following problems have made effective sealing and market success elusive: a) Valve structure susceptible to the formation of leak paths b) Valve structure susceptible to shock forces c) Inconvenient cleaning d) Modern sports liquids contaminating valve sealing faces e) Valve distortion due to mounting within uneven container bottom-walls.

U.S. Pat. No. 6,779,694 issued to Young, and U.S. Pat. No. 5,431,290 issued to Vinciguerra both show pressure equalizing bottles permitting air within the container. However, neither of these patents accomplishes an affirmative valve, or seal, closure, thus they are not suitably effective for preventing leakage of sports liquids.

Flinn, U.S. Pat. No. 5,433,353 discloses a sports bottle with a disc valve on a container's bottom-wall for steady pouring of contents. Flinn shows a rigid radial seating surface, and a complimentary silicone seating element supported by a central stem. The means of valve actuation is the interaction between a rigid seating surface and a silicon seating element, which actuates vertically in relation to the rigid seating surface. However, this approach has several serious limitations:

a) The configuration of the valve is vulnerable to leakage when used with impure, sports liquids. It is well known that umbrella, or disc, valves are highly dependent upon a high degree of surface flatness to accomplish an effective seal. This is partially due to the rigid nature of the seating surface. However, when such valves are used with sports beverages, residues and films easily build upon the seating surface, altering its surface properties and permitting leak paths to form. With the valve being beneath the fluid level of the container, liquid pressure causes the valve to leak. Flinn makes no reference to sports beverages that cause these problems, which are widely used in sports bottle market. Additional well known disadvantages of the type of valve used in the Flinn patent are: a) Both components are separately constructed, thus the fitting between the two components is highly susceptible to surface finish and alignment problems. b) The circumferential length and width of the seating surface results in a relatively broad critical sealing area, increasing the potential for leak paths to form. c) One component of the seal is compliant, while the other is rigid.

b) The configuration of the valve is vulnerable to leakage caused by shock forces. Flinn's valve actuates in a vertical orientation, which is highly problematic when the container encounters shock forces commonly exerted upon bottles in bottle holders on bicycles. The shock forces cause an upsetting of the valve, permitting small air charges to enter the container, thereby permitting liquid to breach the valve seal. If particulates lodge within the seal, leakage is imminent; otherwise sports liquids will begin to form a layer of residue within the seal face, altering its flatness properties, allowing leak paths to eventually form. These air charges, and breaching, also cause an audible popping, or clicking, noise which is distracting for cyclists.

c) The valve sealing junction is difficult to access for cleaning, unless it is removed. Both Vinciguerra, and Flinn refer to disassembly in order to facilitate cleaning, as Flinn maintains in column 5, lines 7-9. However, this disassemble-to-clean method is inconvenient and adds a step when compared with cleaning an ordinary sports bottle. Thus making it inconvenient to maintain a clean bottle and valve, and further increasing the likelihood of leakage.

d) The shape of the valve and the seating surface promote the gathering of settled particulates near the valve's critical sealing junction. Due to its flat profile and annular crevice, particulates settle near the critical sealing junction of the valve, making it particularly vulnerable leakage caused by particulates binding within the sealing face.

e) The complexity of the valve mechanism increases the bottle's cost and reduces its reliability. Flinn states at column 4, lines 23-36, that the preferred method of attachment of the valve housing to the container is by ultrasonic welding. Flinn also discloses an alternate mounting approach by threading. However, both of these methods and add steps and cost to manufacturing.

It has been recognized that it is desirable to impose a preload closing force on some duckbill type valves. Examples of such prior art are U.S. Pat. No. 6,092,551 issued to Bennett, U.S. Pat. No. 5,301,707 issued to Hofsteenge, and U.S. Pat. No. 5,010,925 issued to Atkinson. All of these prior valves utilize laterally imposed forces to cause a preload effect upon the valve slit. However, these valves have several serious limitations:

a) They are not suited for a cylindrical push-in, gasket type mounting.

b) They are not configured for an even circumferential compression mounting, and have uneven lateral pressure within hole mounting applications.

c) They require substantial and uneven lateral compression to accomplish preloading, causing substantial distortion of the valve body, further causing mounting difficulties and fitting complexities.

d) They are not configured for mounting within varying, unpredictable wall thicknesses. Such uneven wall thicknesses cause sealing, mounting, and distortion problems when interacting with fixed size grooved, or snap-in, mounting features of such duckbill valves.

e) They are either suited for inward lateral preloading, or outward lateral preloading, but not both; thus, their non-circular nature is overly complex for gasket style mounting.

f) Hofsteenge and Atkinson show external ribs on the valve panels that require additional supportive structure to function properly, this structure would be undesirable within the bottom of a sports bottle, as well as difficult to clean.

SUMMARY OF THE INVENTION

The present inventor has discovered that certain valve properties, when combined, have a significant positive effect on the valve's seal, and are suitably effective for providing leak resistance when used with highly supplemented sports beverages, and when encountering shock forces from bicycles. In short, a bottle and bottom-wall mounted valve assembly is provided, having a unitary valve with laterally opposed, mutually conformal slit faces, a precise, or mated fit, and a preload across the sealing junction, in order to achieve leak resistant operation with sports beverages and shock forces encountered from bicycles—something eluding to known previous inventors of bottom-mounted, valved sports bottles.

One object of the present invention is to provide a sports bottle and bottom-mounted valve assembly that provides effective pouring, squeezing and suction dispensing modes, and which improves the leak resistance of such bottom-mounted valves when used in sports scenarios and with water, and impure sports beverages.

It is another object of the present invention to provide a valve of particular resistance to leakage occurring from residues and particulates of modern, supplemented sports beverages.

It is a further object of the present invention to provide a bottle and valve configuration resistant to leakage and noise caused by shock forces encountered in sports and cycling.

It is yet another object of the present invention to provide a valve assembly with a sealing junction unhindered by varying wall thicknesses and seams of container bottom-walls.

It is still another object of the present invention to provide a valve assembly easily cleaned without removal and disassembly, thereby increasing the convenience and frequency of routine cleaning.

It is still another object of the present invention to provide a valve with a simplified mounting configuration thereby reducing manufacturing costs.

It is still another object of the present invention to provide a smooth singular valve component in contact with the beverage, minimizing crevices that potentially harbor residues, particulates, and bacteria.

BRIEF DESCRIPTION OF THE DRAWINGS

The operational features of the present invention are explained in more detail with reference to the following drawings, in which like reference numerals refer to like elements, and in which:

FIGS. 9A and 9B are magnified sectional views of a tip of a valve taken along line 8-8 of FIG. 8A, and along line 10-10 of FIG. 10 respectively, in accordance with one embodiment;

FIG. 10 is a perspective view of a valve in an open position in accordance with one embodiment;

FIG. 11 is a sectional side view of a sports bottle in a tilted drinking position showing variables effecting the operation of the device in accordance with one embodiment;

FIG. 15 is a side cross sectional view of a removable container base and a valve assembly in accordance with another embodiment; and FIGS. 16A to 16E are perspective and side cross sectional views of valves with vertically oriented contours in accordance with other embodiments.

DETAILED DESCRIPTION OF THE INVENTION

Figure 1:
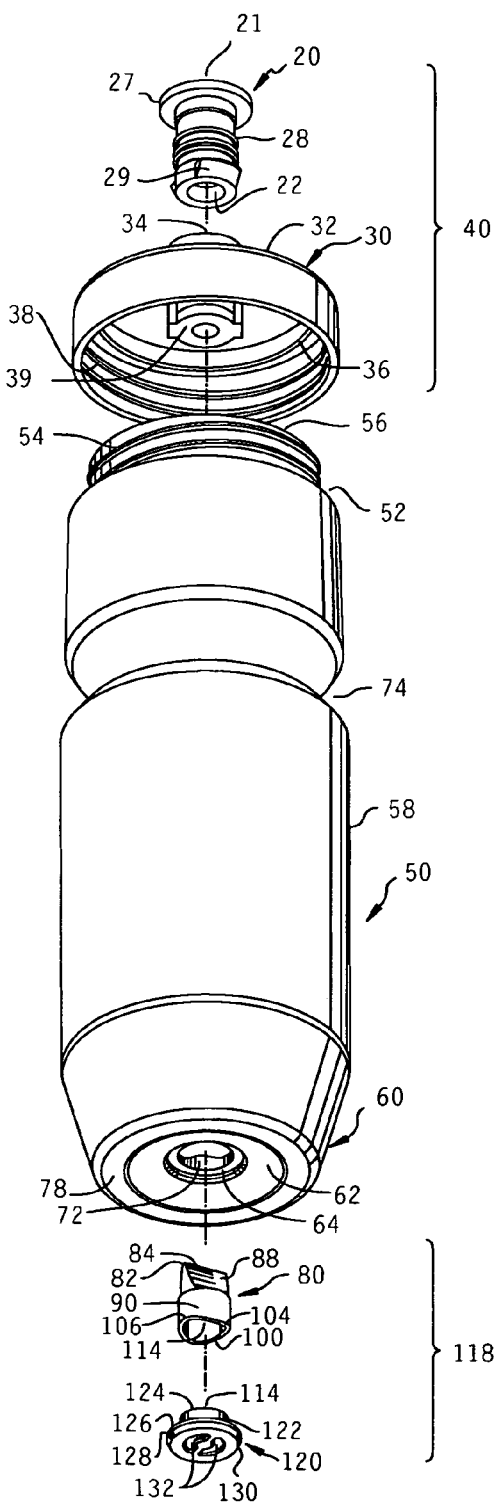
FIG. 1 is an exploded side perspective view of a sports bottle of one embodiment, showing a mouthpiece, lid, vessel, valve, and insert in accordance with one embodiment.

FIG. 1 is an exploded, side perspective view of one embodiment of the invention. It consists of a mouthpiece 20, a lid 30, a vessel 50, a valve 80, and an insert 120.

Mouthpiece 20 consists of a dispensing opening 21, a fluid passage 22, a lip 27, sealing rings 28, and barbs 29. Mouthpiece 20 is preferably injection molded from a soft plastic, or a firm rubber material permitting sealing rings 28, dispensing opening 21, and barbs 29 to be moderately compressible. The soft material also provides comfortable interaction between mouthpiece 20 and a user's mouth and teeth.

Lid 30 consists of a top wall 32, an annular bore 34, a tapered ridge 36, internal threads 38, and stopper plug 39. Lid 30 is preferably injection molded from a material such as high-density polyethylene (HDPE), or similar material.

A lid assembly designated generally by the number 40 comprises the combined mouthpiece 20 and lid 30, which is joined by compressing mouthpiece 20 within annular bore 34, between stopper plug 39 and annular bore 34. When joined with lid 30, mouthpiece 20 is movable between an open and closed position in a pull to open, push to close manner. Lid assembly 40 is also threadably engagable with vessel 50, for filling, emptying, and cleaning of vessel 50.

Vessel 50 consists of a fill opening 56, an annular neck 52, external threads 54, handling groove 74, sidewall 58, bottom side 60, concave base 62, stepped hole 64, and bottom-wall 78. Also shown is uneven wall thickness 72. Vessel 50 is preferably blow-molded from a material such as low-density polyethylene (LDPE), bio-derived low-density polyethylene (BIO LDPE), polypropylene (PP), or similar material. The sidewall 58 of vessel 50 is substantially thin and of a material of resiliency and memory such that when compressed and released, the wall structure will return to its original form.

Valve 80 is a duckbill type valve and consists of a compression sleeve, or sleeve 90, converging panels 88, tip 82, slit 84, sinuous contour 100, lower apexes 104, upper apexes 106, and a central vent path 114. Valve 80 is preferably molded of a resilient silicone rubber material having a durometer of 60 Shore A. Slit 84 is preferably sliced in a post molding process.

Insert 120 consists of a reinforcing tube 122, a top edge 124, a groove 126, a flange 128, an insert chamfer 130, air vents 132, and a central vent passage 114. Insert 120 is preferably injection molded from HDPE, or a similar material. Insert 120 is also it is preferably molded in a brightly colored material providing a high degree of visibility for branding and identification purposes.

A valve assembly designated generally by the number 118 comprises the combined valve 80 and insert 120, which is joined by downwardly seating the valve upon reinforcing tube 122 of insert 120. Stepped hole 64 on a bottom-wall 78 of vessel 50 is shaped to receive valve assembly 118 in a push-in manner.

The present inventor first experimented with grooved, or snap-in, type duckbill valves mounted within drilled holes on the bottom of blow-molded polyethylene sports bottles. Although the bottles rapidly dispensed their sports beverage contents, gravity poured, and had improved flow properties, leakage occurred with some bottles, while others were relatively leak free.

The present inventor embarked on a series of experiments relating to discovering leak resistant valve designs, such experiments included live event testing in triathlons. Multiple bottom-mounted valve and bottle configurations were tested by actual triathletes including bottom-mounted duckbill and umbrella, or disc, valve configurations. Multiple idiosyncrasies, as well as subsequent discoveries are summarized below:

a) In general, conventional duckbill type valves demonstrated superior leak resistance compared with disc valves, although conventional duckbills did still exhibit leakage.

b) Disc valves are highly susceptible to shock, resulting in liquid breaching the critical seal, or seal face, and an audible clicking, or popping, noise which cyclists reported as annoying and disruptive to their focus.

c) Film, or residue, buildup was observed on seating surfaces of disc valves, disrupting surface flatness and causing such containers to leak.

d) Duckbill valves having a grooved, or snap-in mounting also leaked. Isolation revealed that a primary disruptive variable was uneven bottom-wall thicknesses interacting with the snap-in feature, causing irregular vertical strain, affecting the valve and slit face geometry.

e) Duckbill valves showing visible light through their slit under neutral pressure did not provide dependable sealing. Although liquid pressure within the bottles did tend to provide a closing force, liquid pressure alone is not adequate for the reliable sealing of sports beverages for bottom-mounted duckbill valves.

Figure 4A:
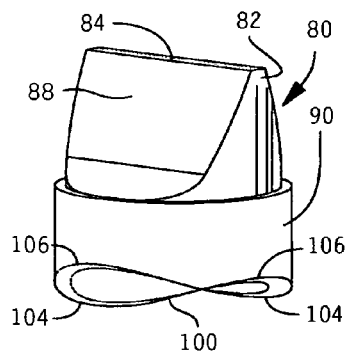
FIGS. 4A to 4C are perspective views and a sectional view taken along line 4-4 of FIG. 4B of a duckbill valve demonstrating the principle of vertically oriented contours resulting in a preloading of a slit.
Figure 4B:
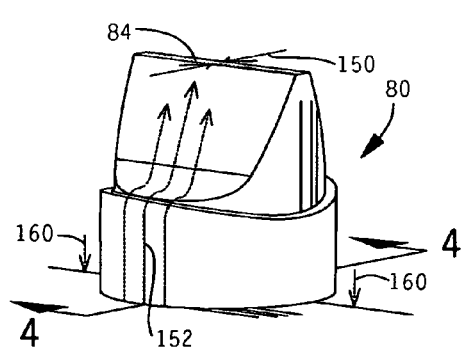
Figure 4C:
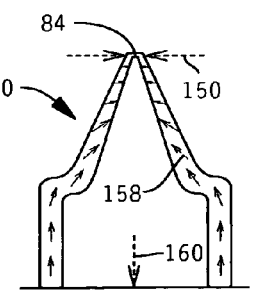

The applicant then focused his efforts into studying strain within the mounting of the duckbill valve. And more particularly to avoiding disruptive strain, and utilizing beneficial strain. Experiments were conducted with lateral and vertical strain. Additional discoveries are summarized below:

a) Lateral strain tended to overly distort the valve body. Vertical strain, although difficult to maintain in position, did provide a consistent lateral effect upon the slit.

b) By using a vertically sinuous contour along the bottom of a valve's sleeve, an effective vertical uplift could be introduced as the valve was pushed downward against a flat surface, best seen in FIGS. 4A to 4C, resulting in an even urging, or preloading effect upon the slit.

c) By orienting sinuous contour 100 with upper apexes 106 in parallel alignment with slit 84, and lower apexes 104 in perpendicular alignment with slit 84, a positive preload force 150 is obtained.

d) By the contour being integral with the sleeve, the preload tendencies of the valve remain in constant alignment with the slit.

e) A correlation exists between apex variation and preload force. That is, the greater the distance between the upper and lower apexes, the greater the preload.

f) The preload may be quantified. By reversing the upper and lower apexes, a negative preload is imposed, resulting in the slit maintaining an open position. The open slit, unlike a closed slit, may be measured. This value may then be correlated with the correctly oriented apexes and preload. The quantifying of the preload is useful for the optimization of sealing properties, the minimizing of geometric distortion, and the prevention of slit faces sticking together.

g) Vertical strain forces may be transferred through a compression, or gasket junction, permitting sealable mounting of the valve assembly, while also maintaining the valve in the important, and highly beneficial preloaded state. This may be accomplished by reinforcing the valve from the inside of its sleeve while the valve is in the preloaded state. This approach solves the problem of mounting within varying bottom-wall thicknesses, because regardless of the wall thickness, the vertical stress forces may pass through the mount junction, which allows their transfer to prevail upward to the slit regardless of wall thickness, wall variation, or variation accentuated by a seams.

h) Contours may also be effectively used above the mounting junction, and therefore closer to the slit.

Testing revealed this configuration to be highly effective in preventing leakage of impure sports beverages. It is believed that the configuration is highly leak-resistant due to several factors: a) The very small surface area of the critical sealing junction b) The matching, or mated, surface shape and surface finish of contacting slit faces c) Both slit faces are equally conformal d) The closing force is equal and opposite e) By preloading a slit with the aforementioned properties, a high-integrity slit is accomplished. Additionally, the mounting is highly effective because it permits a consistent mounting of the valve regardless of uneven mounting wall thickness variations.

Figure 2A:
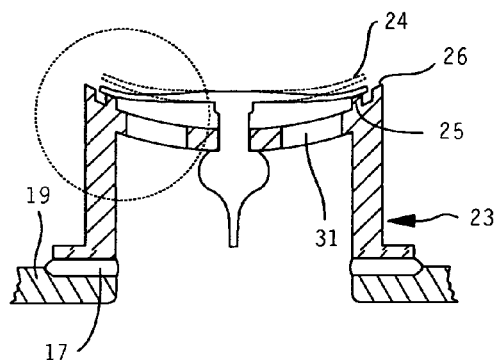
FIGS. 2A and 2B are a side cross sectional view, and a magnified partial view of the valve of the Flinn patent.
Figure 2B:
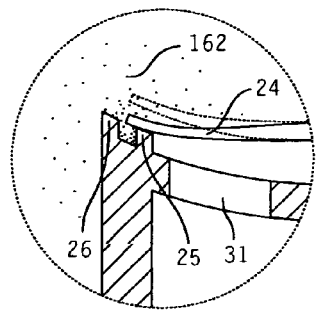

Referring to FIGS. 2A and 2B Prior Art, the valve of the Flinn patent is shown in a cross-section side view of the preferred embodiment. FIG. 2A shows a container base 19, a valve housing 23, a seating element 24, a seating surface 25, an outer lip 26, ultrasonic welding 17, and vent apertures 31. Importantly, Flinn's critical sealing junction, the junction between seating element 24, and seating surface 25, consists of one rigid side, and one compliant side. The two components are also separately constructed, meaning that their surface finishes are also separately formed. Meaning that molding knit marks, or other production surface variation, will not match on opposite sides of the critical sealing junction. In addition, the critical sealing junction has a relatively broad area, making the seal vulnerable to leakage, especially with a light valve closure. Flinn does not give dimensions, however, scaling from Flinn's figures reveals a seating surface width of approximately 0.045 inches, and an overall seating surface area of approximately 0.147 inches$^2$. The effects of this broad area are: reduced compression per square inch, and also increased potential for the formation of leak paths. Also note the actuation travel of seating element 24, shown in an alternate position. This travel occurs vertically making the valve highly susceptible to shock forces. When referring to the closing force of seating element 24, Flinn states at column 3, lines 63-67, that fluid inside the container biases the seating element 24 against the seating surface 25 to prevent fluid from being discharged through the bottom of the container when the container is in the upright position. Flinn further reveals the vulnerable and conjunctive valve operation between seating element 24 and seating surface 25. At column 4, lines 3-6, Flinn states that the outer lip 26 serves as a barrier to such currents to prevent the water from pushing between the seating surface 25 and the seating element 24 and breaking the water-tight seal. However this conjunctive element contributes to the gathering of particulates best seen in FIG. 2B. Additionally, this conjunctive element does not prevent the disruptive vertical forces such as shock forces.

Also note that for the seating element 24 to be removed, it must be removed from the inside of the container. This is highly vexing, given that in the preferred embodiment, valve housing 23 is molded in place and an adult's hand cannot reach the bottom wall of a container of this type. Flinn does mention that the valve housing may be threadably attached to the container, however this introduces further leak potential.

FIG. 2B shows a magnified partial view of FIG. 2A. Note the non-mated fit between seating element 24 and seating surface 25, particulates 162, and the close proximity of particulates 162 to the critical sealing junction, as well as the settling nature of such particulates. It is important to understand that when such particulates bind between seating element 24 and seating surface 25 that significant leakage occurs.

Figure 3:
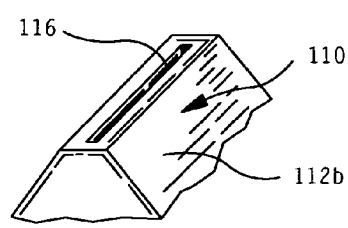
FIG. 3 is a side perspective view of the valve of the Vinciguerra patent.

Referring to FIG. 3 Prior Art, the valve of the Viciguerra patent is shown in a perspective view of the preferred embodiment. FIG. 3 shows a one-way air valve 110, a sidewall 112b, and a passage, or slit 116. Note the exposed slit face of slit 116. Vinciguerra states at column 3, lines 59-66, that optimum slit dimensions are 0.375 inches long, 0.014 inches wide, and 0.005 inches deep. This open geometry, easily shows visible light through slit 116, and is not suitable for effective independent sealing. Rather, the valve of the Vinciguerra patent relies upon a conjunctive nipple to accomplish a type of sealing. At column 3, lines 24-27, Vinciguerra states that a nipple works in conjunction with the valve 110 to prevent leakage of the bottle contents (milk, formula, or the like). However, such nipple structure intended for infants hinders the bottle's capacity of pouring.

The principle of vertically oriented contours generating a preload is shown in FIGS. 4A to 4C. Referring to FIG. 4A, an integrally formed, or unitary, elastomeric duckbill valve is shown having a sinuous contour 100 along the bottom of sleeve 90, two lower apexes 104, and two upper apexes 106. Two upward converging panels 88 meet at tip 82. Slit 84 is disposed along tip 82. Lower apexes 104 are in perpendicular alignment with slit 84, while upper apexes 106 are in parallel alignment with slit 84.

FIG. 4B shows the same valve flattened downwardly against a flat surface, with forces 160, such that sinuous contour 100 is flattened, and upper apexes 106 are seated along the same plane as lower apexes 104. This efficiently introduces uplift forces 152 on opposite sides of valve 80. Strain forces 152 converge along slit 84, thus preloading slit 84 with equal and opposite preload forces 150. Due to the gradual nature of the contour, the preload is evenly and firmly distributed. In FIGS. 4A to 4C, contour 100 is exaggerated for the sake of clarity. Preferably, contour 100 is as minor as necessary to accomplish affirmative valve closure. By way of example, a distance less than 1 mm from upper apex to lower apex has been found suitable, although various distances may be used. This also keeps valve distortion to a minimum and reduces healing, or sticking, of opposite sides of slit 84, or slit faces 86, to one another. To further reduce sticking, valve 80 is preferably molded with an FDA compliant, low-blocking, or low-stick silicone compound. Additionally, by varying the severity of sinuous contour 100, the preload and the opening, or cracking, pressure of the valve may be increased or decreased.

FIG. 4C shows a sectional view of valve 80 taken along line 4-4 of FIG. 4B while preloaded. Note the downward imposing force 160, and resultant stress trajectories 158, leading up to slit 84. The stress trajectories are similar to those found in structural arches, with the exception that the load originates from beneath. Importantly, note that stress trajectories 158 flatten near slit 84, providing an even, laterally opposed preload 150.

Figure 5A:
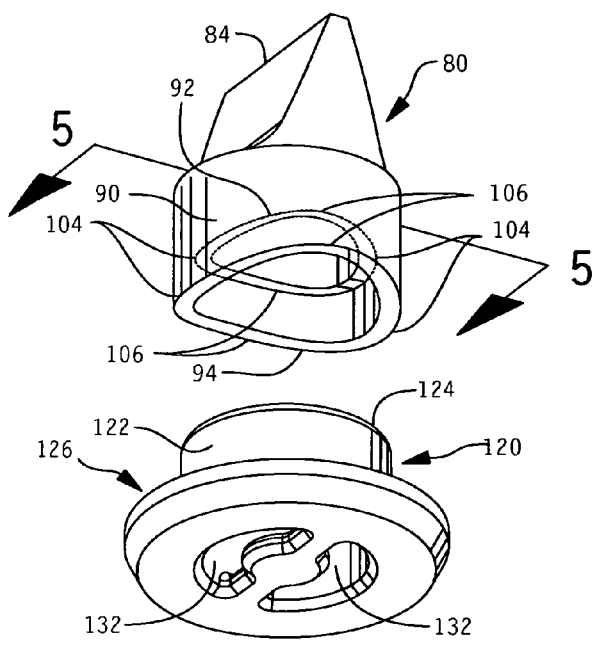
FIGS. 5A and 5B are respectively, perspective and elevational sectional views of a valve and insert prior to assembly, with FIG. 5B taken along line 5-5 of FIG. 5A in accordance with one embodiment.
Figure 5B:
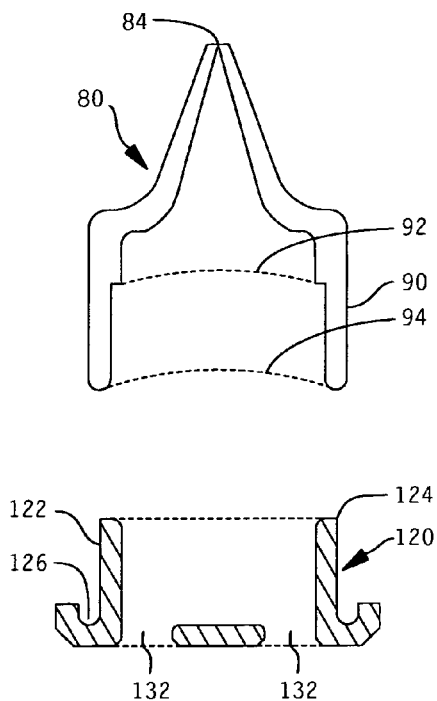

Turning to FIGS. 5A and 5B, valve 80 and insert 120 are shown prior to joining. Note in this embodiment, that there are two contours, an inside contour 92, and an underside contour 94, and that each contour has two upper apexes 106 and two lower apexes 104. Lower apexes 104 are in perpendicular alignment with slit 84, and upper apexes 106 are in parallel alignment with slit 84. Also shown are reinforcing tube 122, top edge 124, groove 126, and air vents 132. Also note that between vents 132 a section of material may serve to guard central vent passage 114.

Figure 6A:
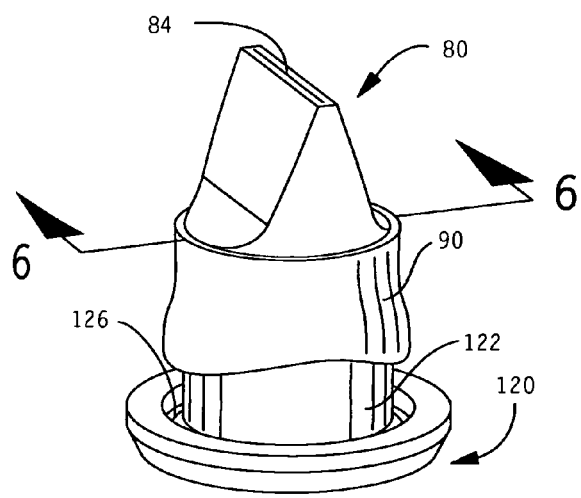
FIGS. 6A and 6B are respectively, perspective and elevational sectional views of a valve partially stretched over an insert, with FIG. 6B taken along line 6-6 of FIG. 6A in accordance with one embodiment.
Figure 6B:
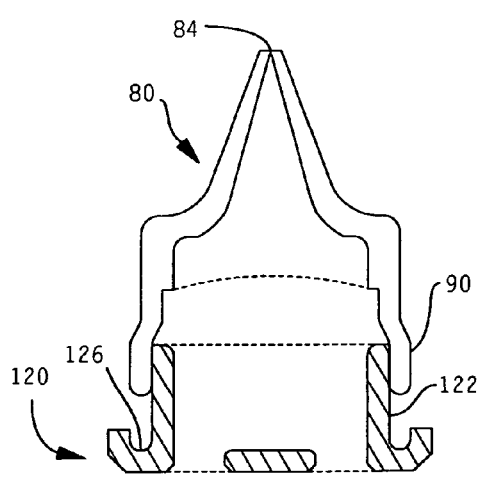

FIGS. 6A and 6B show valve 80 and insert 120 partially joined. Note the stretched position of sleeve 90, which is held in position due to the interference fit between sleeve 90 and reinforcing tube 122. Although manual seating is sufficient, a tamping tool may be used to ensure even seating within production.

Figure 7A:
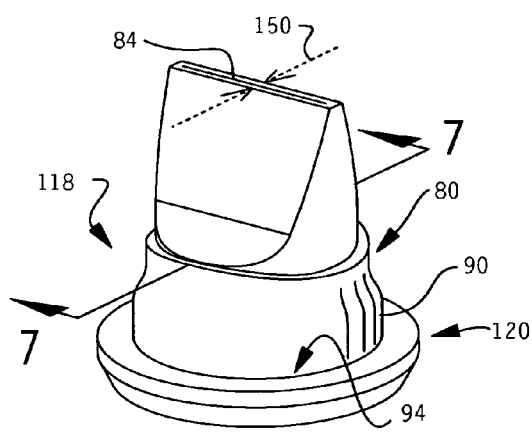
FIGS. 7A and 7B are respectively, perspective and elevational sectional views of a fully joined valve and insert, with FIG. 7B taken along line 7-7 of FIG. 7A in accordance with one embodiment.
Figure 7B:
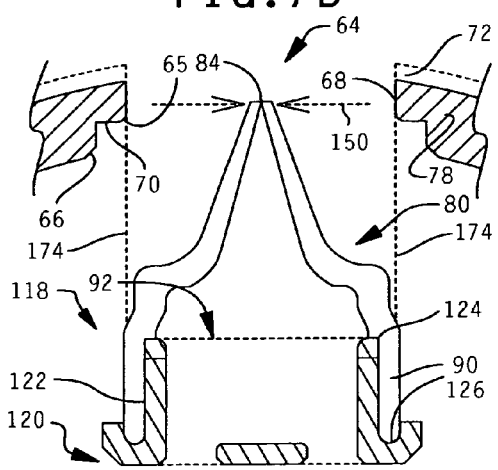

Turning to FIGS. 7A and 7B, as valve 80 is pushed downwardly over insert 120, underside contour 94, and inside contour 92, seat with groove 126 and top edge 124, respectively, thus establishing preload forces 150 upon slit 84. Valve 80 is maintained in the preloaded state upon insert 120 due to the interference fit. Note the smooth, cylindrical state of sleeve 90. The combining of valve 80 and insert 120, establishes a valve assembly 118, seen below stepped hole 64 of FIG. 7B. Note the features of stepped hole 64 within vessel bottom-wall 78: an inside diameter 68, a rounded edge 65, a landing 70, a vessel chamfer 66, and variable wall thickness

72. Prior to insertion, valve assembly 118, or stepped hole 64, may be treated with a food-safe friction reducing agent such as isopropyl alcohol.

As valve assembly 118 is inserted within stepped hole 64, rounded edge 65 meets the smooth, reinforced, compressible sidewall of valve assembly 118 shown with insertion travel 174. It is important that the features of stepped hole 64 are properly sized to allow a smooth frictional engagement. If too tight, the hole could tear sleeve 90, if too loose, valve assembly 118 will not securely seal within hole 64. As valve assembly 118 is pushed within stepped hole 64, sleeve 90 is compressed between reinforcing tube 122 and inside hole diameter 68, establishing a gasket-type engagement, and maintaining the established preload forces regardless of varying wall thickness 72.

Figure 8C:
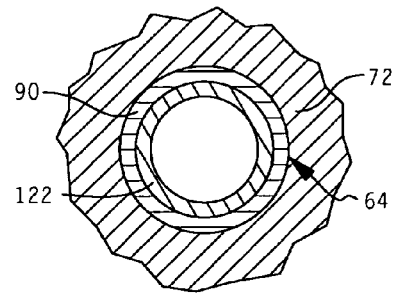
FIGS. 8A to 8C are respectively, perspective, elevational sectional, and top sectional views of an operational valve fully mounted within a bottom-wall with a preloaded state maintained, with FIG. 8B taken along line 8-8 of FIG. 8A, FIG. 8C taken along line 9-9 of FIG. 8B, in accordance with one embodiment.
Figure 8A:
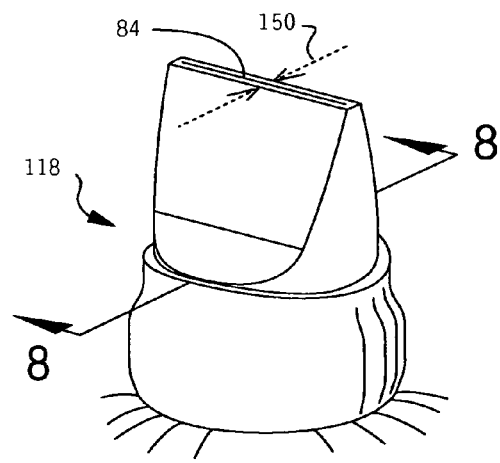
Figure 8B:
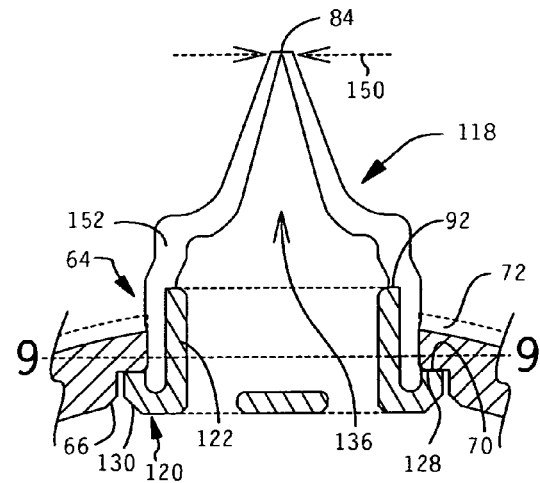

Referring to FIGS. 8A to 8C, valve assembly 118 is shown fully inserted and seated within stepped hole 64. Note that preload forces 150 are maintained, and that inside contour 92 seating is above wall thickness variation 72, so as to ensure even preloading regardless of mounting variation. Also note flange 128 is seated with landing 70, and that vessel chamfer 66 and insert chamfer 130 provide a tamper-resistant, recessed seating of insert 120 within stepped hole 64. Ambient air 136 has free access to slit 84. Importantly, note that along line 9-9 an even circumferential compression is accomplished while also permitting uplift forces 152 to pass through the compression mounting. FIG. 8C shows an even circular compression, taken along line 9-9 of FIG. 8B. Note that the compression is circumferentially even, and occurs on both sides of sleeve 90, as sleeve 90 is compressed between hole 64 and reinforcing tube 122. This is different than the prior art preloaded duckbill valves that use an uneven lateral side loading from either the inside or the outside of the valve.

Turning to FIG. 9A, an extreme close up view of the preloaded slit 84 is shown along line 8-8 of FIG. 8A. Importantly, note that even if slit 84 is uneven, as shown, that slit faces 86 fit together with an indexed, or mated, fit. Due to slit 84 being formed by the slicing of a unitary component, the surface finish, and surface fit within the sealing junction matches on opposite sides. Also note stress trajectories 158. Additionally, both slit faces 86 are conformal, or compliant, permitting a compression to occur on both sides of slit 84. Also highly important, is the fine, low surface area junction. For example, in one embodiment, slit 84 has a length of 0.41 inches, and a depth of 0.01 inches, resulting a slit surface area of approximately 0.0041 inches$^2$. This surface area is approximately 36 times smaller than the critical sealing area of the valve of the Flinn patent, shown in FIG. 2A. This low surface area, combined with a preload establishes an effective pressure per square inch upon opposite conformal slit faces, to cause a compression type seal, vastly reducing the potential for leak paths to form within the sealing junction, and thus being highly effective for use with impure sports liquids.

Referring to FIG. 9B, note the focused path of air shown with arrow 138. It is believed that in operation, a self-cleaning effect occurs due to: a) the focused stream of air 138, and b) that due to the compliant, low surface area, and precise fit of the sealing junction, that liquid which may be present within slit 84 is forced out of the junction upon the closing of slit 84. It is also believed that this high-integrity seal will seal even with residue upon slit faces 86. Additionally, note that slit 84 actuates, or opens, laterally. This actuation orientation makes the present inventor's valve particularly resistant to shock forces, and valve clapping, which easily occurs with the valve of the Flinn patent as it encounters shock forces originating from bicycles traveling over asphalt.

FIG. 10 is a perspective, partial view of valve 80 in the open position. The fine, inside slit face 86 can be seen, along with direction of air 138. Importantly, the openness of slit 84 varies according to the pressure differential between ambient outside pressure 136 and internal bottle pressure.

FIG. 11 shows the primary variables effecting the container's operation. The variables are expressed in the following reference letters: liquid column, C; valve flow rate, R; dispensing opening diameter, O; liquid outflow, F; and stop-flow level, S.

In an ordinary sports bottle with an opened, generally narrow dispensing opening, an initial discharge of liquid causes a slight pressure drop due to the displacement of liquid. This drop in pressure is enough to stop any further liquid from exiting the container. The limited amount of fluid discharged from such conventional containers is typically a small dribble or otherwise a very limited dose of fluid. However, the container of one embodiment is different in that this drop in pressure opens the preloaded valve, which then provides continuous pressure equalization within the container while liquids are dispensed. Rather than tilting the container to ready it for either squeezing or suction, as with a conventional sports bottle, the container of one embodiment utilizes tilting as means of initiating gravity based pouring. Thus, the single act of tilting of the container serves as the input for the user to receive, without any further effort, a continuous and ample volume stream of liquid by means of gravity flow.

Thus, as liquid column C decreases, so to does liquid outflow, F. The valve flow rate R has a major effect upon the liquid outflow, F. For instance if a small valve, with a limited flow rate is used, output F will be reduced. Preloading the valve generally reduces valve flow rate R, however if preloading is factored into the design and sizing of the valve, a target liquid outflow F may be achieved. The applicant has found that an approximate average liquid outflow F of 1 oz per second is suitable to provide desirably rapid hydration in sports.

As liquid flows out of the bottle, the user may control the liquid outflow F by adjusting the tilt of the bottle. Likewise, flow may be abruptly stopped by up-righting the container. The applicant has found that the most forward travel of stream 144 occurs with a bottle tilt of approximately 45 degrees. Liquid exits dispensing opening 21 in a liquid stream 144, which is smooth, air free, and laminar.

The device may also dispense liquid in the mode of squeezing. By applying pressure to sidewall 58, as shown with force arrows 164, internal container pressure 140 may be increased resulting in an increased output flow F, shown in phantom. This rise of the container's interior pressure 140 maintains slit 84 in a closed position, permitting an effective squeezing of the container, without discharge or leaking through valve 80.

Liquid from the bottle may also be drawn by suction. This mode of use may be continual, unlike conventional sports bottles, which require interruption, or pausing, to repressurize during suction use.

As liquid column C declines, it reaches a stop flow level S. This level is associated with the closing of valve 80, and causes the gravity pouring of the bottle to cease. The stop-flow level S is determined generally by the degree of preload imposed upon slit 84. It is beneficial to utilize only enough preload to assure that when the container has very little liquid within it, and therefore very little pressure upon the valve, that the valve is affirmatively closed. That is to say, stop flow level S, may be volumetrically very minor. If light, the preload will not significantly affect output flow F. Additionally, over-preloading the valve increases the chance that slit faces 86 will undesirably stick together. Thus, light levels of preload are preferred.

After the stop-flow level S is reached, the remaining amount of liquid must be dispensed by an alternate mode of dispensing. Either by squeezing, by suction, or by combined squeezing and suction.

Figure 12:
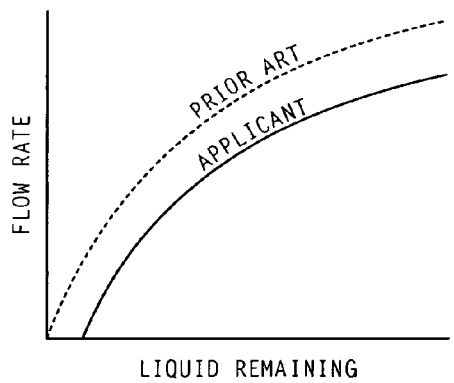
FIG. 12 is a chart indicating the flow principles of the bottle of the Flinn patent and the applicant's bottle in accordance with one embodiment.

Turning to FIG. 12, a chart is shown indicating flow properties of the applicant's container and the container of the Flinn patent. The chart represents a sports bottle filled with liquid and inverted to pour its contents, until the container will no longer pour. Flinn states at column 5, lines 14-15, that as long as the bottle is inverted, the fluid will flow out. Flinn clearly affirms this property again, at column 1, lines 67-68, by stating that the bottle will allow flow of said fluid whenever said bottle means is inverted. This property is represented by the phantom curve labeled "Prior Art". However, the present inventor has discovered that such a property puts the valve at odds with effectively sealing of modern sports beverages within sports scenarios. The present inventor's unique valve approach utilizes a preloaded, high-integrity valve seal, and is represented with the curve labeled "Applicant". Note the stop flow variable S prevents liquid from draining completely from the bottle. However, this need not be a significant volume of liquid, rather stop flow S, and the preload accomplish an affirmative valve closure at low-pressure differentials between inside bottle pressure and ambient outside pressure. Thus, the applicant's curve is shifted slightly to the right. The chart represents the principles, and not specific values.

Figure 13:
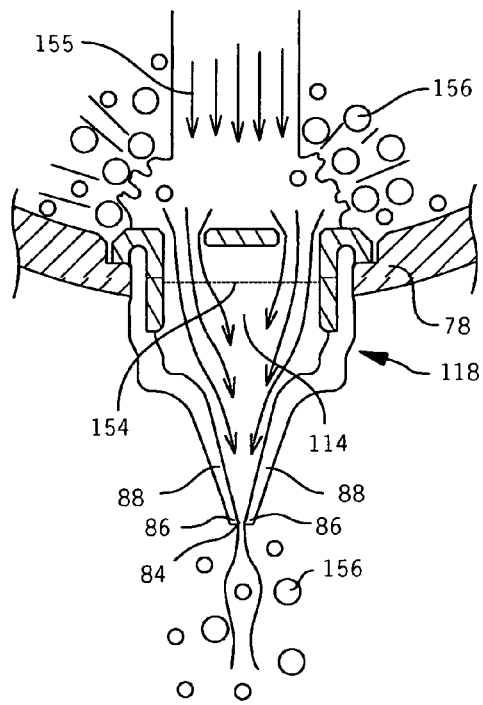
FIG. 13 is a side cross sectional view of a mounted valve and a method of cleaning without removal in accordance with one embodiment.

FIG. 13 shows valve assembly 118 and bottom-wall 78 inverted and exposed to running water passing through slit 84. Multiple features of the present invention permit a highly effective and highly convenient cleaning method. Note that a central vent path 114 is in vertical alignment with slit 84. If central vent path 114 is partially filled with liquid dish soap 154, an example fill level shown in phantom, the soap will begin to dissolve residues and films which may be present on the ambient air side of slit 84. However, due to the closure of slit 84, the soap will not penetrate the slit. Warm running water 155 is then run through central vent path 114, causing the opening of slit 84, and the foaming 156 of liquid dish soap 154. The result is that warm soapy water is forced through the slit. The converging valve panels 88 permit the water to pass through slit 84 at a relatively high rate. As the inside slit faces 86 are exposed to liquid dish soap and warm water, residues are dissolved, and conveyed out of the slit 84. The process continues until the foaming ceases, indicating that the soap has been entirely washed out. Vessel 76 should be cleaned and rinsed following the cleaning of valve 80. This method provides a highly convenient and effective method of cleaning the valve assembly without the disassembly relied upon by the prior art. Thus, the likelihood of the valve actually being cleaned by the user greatly increases, further promoting leak resistance and sanitation.

Figure 14:
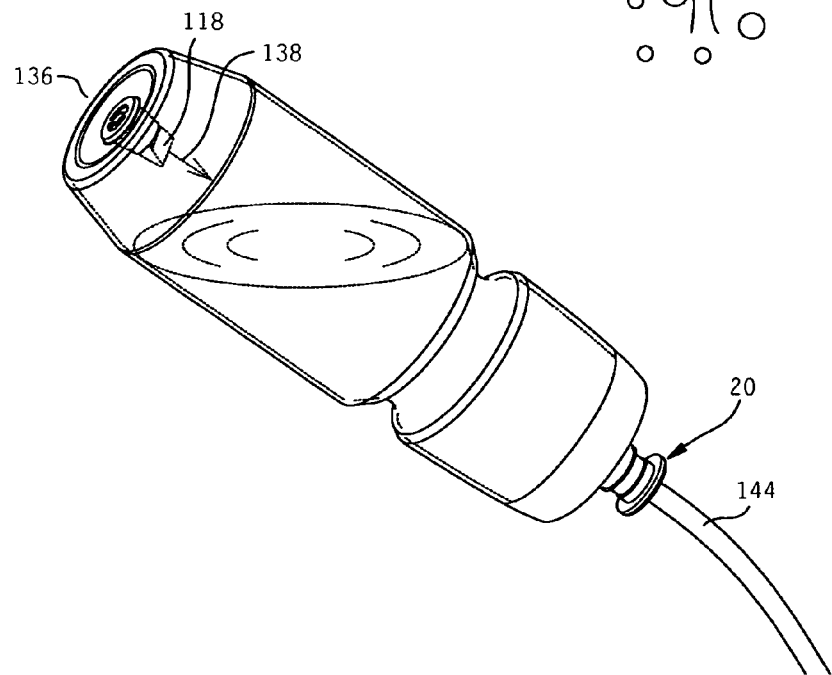
FIG. 14 is a perspective side view of sports bottle in a tilted drinking position dispensing liquid in a stream by gravity pouring in accordance with one embodiment.

FIG. 14 shows a perspective view of the bottle and valve assembly 118 in an inverted position with mouthpiece 20 in an open position, and dispensing in the mode of gravity pouring. Note the smooth laminar stream 144.

The leak-resistant pressure equalization of the invention is useful in other container configurations. For instance, with rigid containers, although not squeezable, the leak-resistant valve configuration provides the advantageous bottom-wall mounting of the valve, and thus improved pouring and drawing of liquid by suction. Additionally, the valve configuration of the invention is beneficial to insulated, squeezable sports bottles. The invention is also useful with a variety of lid and dispensing openings. Additionally, the vertically imposed preload forces may be achieved with a contour molded with the insert.

FIG. 15 shows an advantageous alternate embodiment of the valve configuration with a removable container base 166, and a vessel 168 having an opening on both its top and bottom sides. The advantage of this configuration is increased ease of cleaning valve 80 and vessel 168.

Referring to FIGS. 16A to 16E, perspective and side cross sectional views of various embodiments of valves, inserts, and stepped holes accomplishing vertically imposed preload forces are shown. FIGS. 16A to 16D all accommodate vessel bottom-wall 78, and uneven wall thicknesses 72.

FIG. 16A shows a valve with an irregular bottom contour 102. Note the rounded top edge 124. FIG. 16B shows a valve with an inside contour 92 only, and a flat base along the bottom of sleeve 90. Note a gap 165 in perpendicular orientation with slit 84. FIG. 16C shows a valve with only an underside contour 94. Note the rounded detail of top edge 124. FIG. 16D shows a valve with an underside contour 94, and an outer contour 96. Note also, the rounded detail of top edge 124. Note that all of these designs solve the problem of mounting into anomalous, or non-uniform, wall thicknesses, while also providing efficient vertically imposed preloading, resulting in a high integrity valve seal along slit 84, and simplified, sturdy mounting.

FIG. 16E shows a further alternate embodiment of a valve with a snap-in, or grooved, sinuous contour 97. This design may be used with a uniform container bottom-wall 139. For instance, if the container's bottom inner wall is molded or machined. Note that the valve is not reinforced with a reinforcing insert, and therefore sleeve 90 is under considerably more lateral strain 170. The preload is, however, like FIGS. 16A to 16D, accomplished with an advantageous even circumferential compression, and vertically imposed preloading.

SUMMARY

In contrast to the prior art, the present invention provides a pressure equalizing sports bottle and valve assembly having a high-integrity seal actuating laterally, characterized by excellent leak resistance, shock resistance, and effective pressure equalization, with widely used, residue-forming, impure sports beverages, is easily and effectively cleaned without disassembly, and is easily and consistently installed within non-uniformly thick container bottom walls.

While the above is a complete description of specific embodiments of the invention, various modifications, alternative constructions, and equivalents may be used. Therefore, the above description should not be taken as limiting the scope of the invention as defined by the claims.

What is claimed is:

1. A sports bottle for storing and dispensing sports beverages, comprising:
   a container, with a dispensing opening, a sidewall, a bottom wall, and a round hole in said bottom wall;
   a duckbill valve mountable within said hole, having an even walled cylindrical body, a vertically sinuous contour surface associated with said cylindrical body, and at least two laterally opposed slit faces, which actuate laterally;
   an insert, having a reinforcing tube, an annular flat surface, and a vent, in which the joining of said cylindrical valve body upon said reinforcing tube and the flattening of said vertically sinuous contour surface with said annular flat surface establishes a vertically imposed preload upon said valve body resulting in a preload across said slit faces, while also maintaining said even walled cylindrical body in a cylindrically round state for concentric engagement within said round hole with even circumferential compression, appreciating that said vertically imposed preloading and said round cylindrical state permit mounting compatibility within non-uniform wall thicknesses of said bottom wall, while maintaining said preload across said slit faces for leak resistant valve operation, and reduced restriction dispensing of said sports beverages.

2. The sports bottle according to claim 1 in which said insert and said duckbill valve are joined establishing a preload across said slit faces, and the joined valve and insert, being round, are inserted within said round hole on said container bottom wall in a push-in manner maintaining said preload across said slit faces.

3. The sports bottle according to claim 1 in which said duckbill valve further comprises two vertically sinuous contours, with a first sinuous contour along an inside wall of said compression sleeve for seating with a top surface of said reinforcing tube, with a second sinuous contour along a bottom edge of said cylindrical body for seating with a flat annular surface, for dual preloading interaction with said insert.

4. The sports bottle according to claim 1 in which said reinforcing insert further comprises a centrally disposed vent in vertical alignment with said slit faces for ease of cleaning and rinsing said slit faces.

5. The sports bottle according to claim 1 in which said vertically sinuous contour comprises two upper and two lower apexes, said upper apexes being in parallel alignment with said slit faces and said lower apexes being in perpendicular alignment with said slit faces.

6. The sports bottle according to claim 1 in which said vertically sinuous contour is positioned within an inside wall of said cylindrical body for seating with a top edge of said reinforcing tube for preloading said slit faces from above said container bottom wall.

7. The sports bottle according to claim 1 in which said slit faces are formed by a post-molding slitting process, permitting a mated fit between said slit faces.

8. The sports bottle according to claim 1 in which said cylindrical body fits upon said reinforcing tube with an interference fit for stretchably securing said duckbill valve upon said insert while holding said vertically sinuous contour surface in a flattened state for maintaining said preloaded state prior to mounting within said round hole.

9. The sports bottle according to claim 2 in which said hole further comprises a stepped landing for recessed mounting of said valve and said reinforcing insert within said container bottom wall.

10. The sports bottle according to claim 9 in which said reinforcing insert further comprises a chamfer for tamper resistant mounting of said push-in valve mounting.

11. The sports bottle according to claim 4 in which said central vent further comprises an obstructive guard for partially covering said central vent.

12. A sports bottle for storing and dispensing sports beverages, comprising:
a container, with a dispensing opening, a sidewall, a bottom wall, and a round hole in said bottom wall;
a duckbill valve mountable within said hole, having an even walled cylindrical body, at least two vertically sinuous contour surfaces associated with said cylindrical body, and at least two laterally opposed slit faces, which actuate laterally;
an insert, having a reinforcing tube, at least two annular flat surfaces for contacting said sinuous contours, at least one of said vertically sinuous contours located below said slit faces and above said bottom wall, and a vent, in which the joining of said cylindrical valve body upon said reinforcing tube and the flattening of said vertically sinuous contour surfaces with said annular flat surfaces establishes a vertically imposed preload upon said valve body resulting in the preloading of said slit faces, while also maintaining said even walled cylindrical body in a cylindrically round state for concentric engagement within said round hole with even circumferential compression, appreciating that said vertically imposed preloading and said round cylindrical state permit mounting compatibility within non-uniform wall thicknesses of said bottom wall, while maintaining said preloaded slit faces for leak resistant valve operation, and reduced restriction dispensing of said sports beverages.

13. The sports bottle according to claim 12 in which said insert and said duckbill valve are joined establishing a preload across said slit faces, and the joined valve and insert, being round, are inserted within said round hole on said container bottom wall in a push-in manner maintaining said preload across said slit faces.

14. The sports bottle according to claim 12 in which said insert further comprises a centrally disposed vent in vertical alignment with said slit faces for ease of cleaning and rinsing said slit faces.

15. The beverage bottle according to claim 12 in which each vertically sinuous contour comprises two upper and two lower apexes, said upper apexes being in parallel alignment with said slit faces and said lower apexes being in perpendicular alignment with said slit faces.

16. The sports bottle according to claim 12 in which said cylindrical body fits upon said reinforcing tube with an interference fit for stretchably securing said duckbill valve upon said insert while holding said vertically sinuous contour surface in a flattened state for maintaining said preloaded state prior to mounting within said round hole.

17. The sports bottle according to claim 12 in which said hole further comprises a stepped landing for recessed mounting of said valve and said reinforcing insert within said container bottom wall.

18. A method of mounting a duckbill valve having a slit, an even walled cylindrical body, and a vertically sinuous contour surface associated with said cylindrical body in a preloaded state within a round hole in a container bottom wall, comprising the steps of:
a) joining the cylindrical valve body downwardly upon a reinforcing insert having a reinforcing tube, and an annular flat surface such that said vertically sinuous contour surface is maintained in a flattened state against said annular flat surface resulting in vertically imposed preload forces and the preloading of said slit, said cylindrical valve body being of even wall thickness and reinforced by said reinforcing tube and maintained in a cylindrically round state; and
b) inserting the preloaded, reinforced, and round valve and insert within the hole;
where said preloaded, cylindrically round valve body is evenly compressed within said round hole for mounting and maintaining the valve in a preloaded state.

19. The method according to claim 18 further including coating said cylindrical body with a friction-reducing agent after said vertically sinuous contour surface is flattened and prior to insertion within said round hole.

20. The method according to claim 18 further including downwardly compressing the valve upon the insert with a seating tool prior to insertion for consistent flattening of said vertically sinuous contour surface upon said annular flat surface.

* * * * *